United States Patent
Aoki et al.

(10) Patent No.: US 7,925,828 B2
(45) Date of Patent: Apr. 12, 2011

(54) MAGNETIC DISK DRIVE REFRESHING DATA WRITTEN TO DISK AND DATA REFRESHMENT METHOD APPLIED TO MAGNETIC DISK DRIVE

(75) Inventors: Takao Aoki, Hanno (JP); Yasuhiko Ichikawa, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/492,777

(22) Filed: Jun. 26, 2009

(65) Prior Publication Data

US 2010/0014183 A1 Jan. 21, 2010

(30) Foreign Application Priority Data

Jul. 17, 2008 (JP) .................. 2008-186317

(51) Int. Cl.
*G06F 12/00* (2006.01)
*G06F 13/00* (2006.01)
*G06F 13/28* (2006.01)

(52) U.S. Cl. ................. 711/112; 360/75; 360/48; 714/1

(58) Field of Classification Search .................. 711/112; 360/75, 48; 714/1
See application file for complete search history.

(56) References Cited

U.S. PATENT DOCUMENTS

| | | | | |
|---|---|---|---|---|
| 6,462,896 B1 * | 10/2002 | Codilian et al. | ................ | 360/48 |
| 7,177,979 B2 * | 2/2007 | Kuwamura | ................... | 711/112 |
| 7,522,366 B2 * | 4/2009 | Mettler et al. | .................. | 360/60 |
| 7,567,400 B2 * | 7/2009 | Cheng | .............................. | 360/60 |
| 2004/0193798 A1 * | 9/2004 | Kuwamura | ................... | 711/114 |
| 2006/0066971 A1 * | 3/2006 | Alex et al. | ....................... | 360/31 |
| 2008/0005645 A1 | 1/2008 | Takemura et al. | | |
| 2009/0027799 A1 * | 1/2009 | Rothberg et al. | ............... | 360/75 |
| 2009/0244775 A1 * | 10/2009 | Ehrlich | ........................ | 360/135 |

FOREIGN PATENT DOCUMENTS

| | | |
|---|---|---|
| JP | 03-035477 | 2/1991 |
| JP | 04-052725 | 2/1992 |
| JP | 2004-273060 | 9/2004 |
| JP | 2005-267702 | 9/2005 |

OTHER PUBLICATIONS

Final Notice of Rejection mailed by Japan Patent Office on Dec. 8, 2009 in the corresponding Japanese patent application No. 2008-186317.
Explanation of Non-English Language References.

* cited by examiner

*Primary Examiner* — Stephen C Elmore
*Assistant Examiner* — Mark A Giardino, Jr.
(74) *Attorney, Agent, or Firm* — Knobbe, Martens, Olson & Bear LLP

(57) ABSTRACT

According to one embodiment, a disk has a set of tracks thereon. A controller performs refresh control for reading data by a head from a track on the disk to be refreshed and for writing the read data by the head to a spare track adjacent to the track from which the data has been read. The controller switches the track from which the data has been read to a new spare track after the writing.

3 Claims, 7 Drawing Sheets

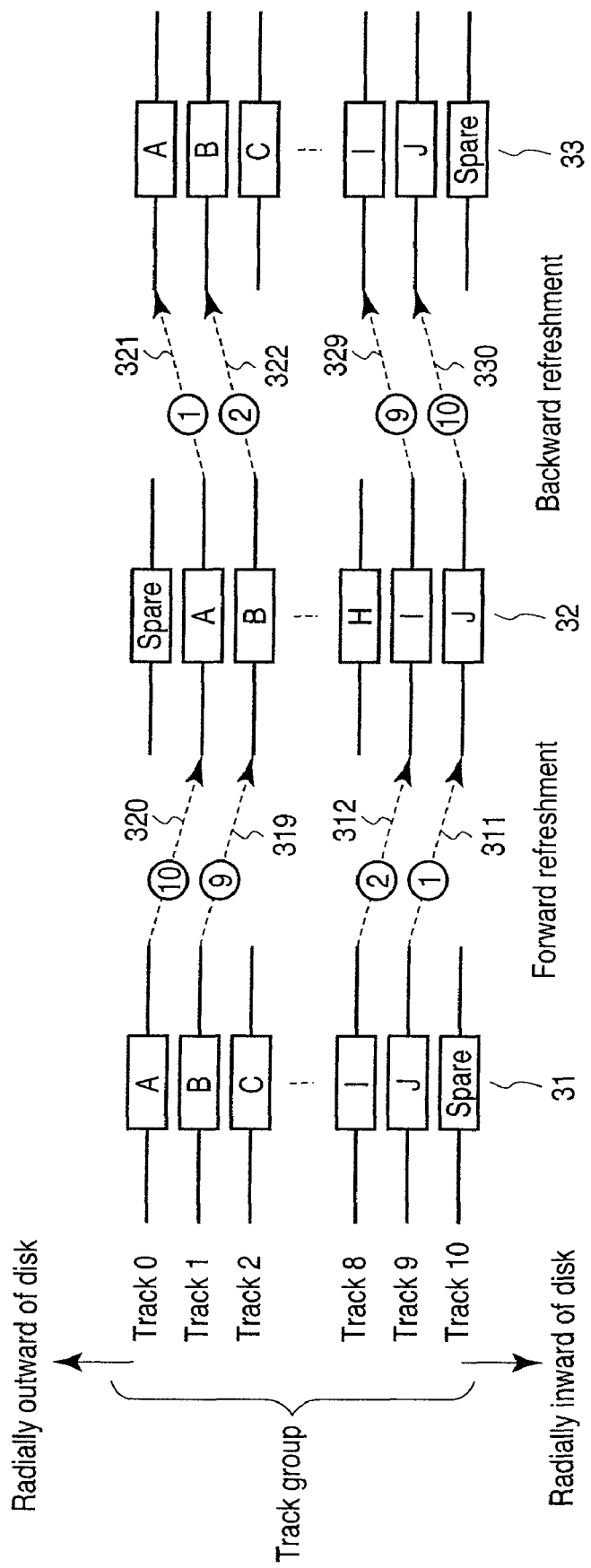
F I G. 3

| Cyl. Group \ Head | 0 | 1 | ··· | m-1 |
|---|---|---|---|---|
| 0 | W(0, 0) | W(1, 0) | ··· | W(m-1, 0) |
| 1 | W(0, 1) | W(1, 1) | ··· | W(m-1, 1) |
| 2 | W(0, 2) | W(1, 2) | ··· | W(m-1, 2) |
| ⋮ | ⋮ | ⋮ | ⋮ | ⋮ |
| n | W(0, n-1) | W(1, n-1) | ··· | W(m-1, n-1) |

F I G. 4

| Cyl. Group \ Head | 0 | 1 | ··· | m-1 |
|---|---|---|---|---|
| 0 | S(0, 0) | S(1, 0) | ··· | S(m-1, 0) |
| 1 | S(0, 1) | S(1, 1) | ··· | S(m-1, 1) |
| 2 | S(0, 2) | S(1, 2) | ··· | S(m-1, 2) |
| ⋮ | ⋮ | ⋮ | ⋮ | ⋮ |
| n-1 | S(0, n-1) | S(1, n-1) | ··· | S(m-1, n-1) |

F I G. 5

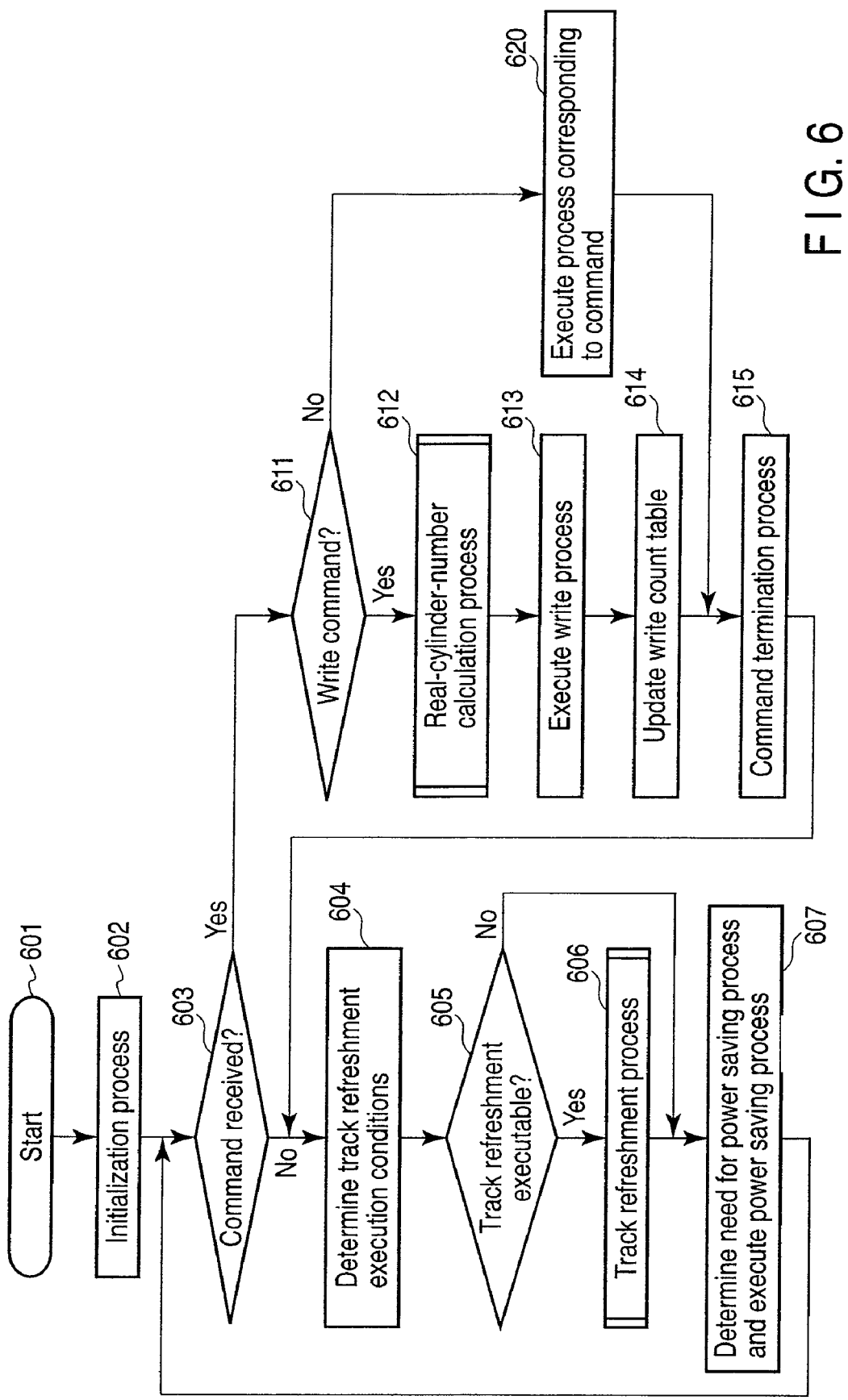
F I G. 6

→ Read
--→ Rotational delay
⇒ Write
- - - Head movement between
===== adjacent tracks

MAGNETIC DISK DRIVE REFRESHING DATA WRITTEN TO DISK AND DATA REFRESHMENT METHOD APPLIED TO MAGNETIC DISK DRIVE

CROSS-REFERENCE TO RELATED APPLICATIONS

This application is based upon and claims the benefit of priority from Japanese Patent Application No. 2008-186317, filed Jul. 17, 2008, the entire contents of which are incorporated herein by reference.

BACKGROUND

1. Field

One embodiment of the invention relates to, for example, a magnetic disk drive that refreshes data written to a disk, and also relates to a data refreshment method applied to a magnetic disk drive.

2. Description of the Related Art

In recent years, efforts have been made to increase the storage capacity per surface (recording surface) of a disk (magnetic disk) mounted in a magnetic disk drive. To increase the storage capacity per disk surface (that is, the areal density), a linear recording density and/or a track density may be increased. To increase the linear recording density, the number of sectors per track may be increased. To increase the track density, that is, to provide more tracks in the disk surface, the track width may be reduced to decrease a distance between adjacent tracks (that is, a track pitch).

Here, it is assumed that the track pitch is reduced to increase the track density. In general, the shorter the track pitch is, the more markedly a data write to a certain track by a head (magnetic head) degrades the data in a track located adjacent to the certain track. Each track has the same width as that of the head (a write element contained in the head). However, the width of distribution of write magnetic fields generated by the head during the data write is not always equal to the width of the head. The write magnetic fields are applied (leak to) to the periphery of the head. Thus, an excessive reduction in track pitch increases, during a data write to a certain tack on the disk by the head, the level of the adverse effect of leakage fields from the head on a track located adjacent to the certain track.

However, even with the reduction of the track pitch, if the level of the reduction is small, the data in the adjacent track is prevented from being immediately corrupted by one or several data write operations. That is, in general, repeated data write operations gradually degrade the data in the adjacent track depending on the number of operations performed.

Thus, data refreshment (rewrite) is becoming essential for recent magnetic disk drives; the data refreshment is performed to recover the data in the adjacent track degraded by the data write operations. For example, Jpn. Pat. Appln. KOKAI Publication No. 2004-273060 discloses a technique (prior art) of refreshing the data in a track located adjacent to a track for which the number of data writes has reached a predetermined value.

According to the prior art, data is read from the track (adjacent track) located adjacent to the track for which the number of data writes has reached the predetermined value. The read data is temporarily stored in a RAM. The data temporarily stored in the RAM, that is, the data in the adjacent track, is written to the adjacent track again. That is, the data in the track to be subjected to data refreshment is rewritten with the data read from that track. Such a data rewrite process, that is, a data refreshment process, recovers the degraded data. Thus, application of the data refreshment process enables a reduction in track pitch.

However, with the prior art, when a power supply to the magnetic disk drive is interrupted during the data refreshment process, the data to be refreshed may be lost. More specifically, when the power supply to the magnetic disk drive is interrupted during an operation (data write operation) of writing data read from the track (hereinafter referred to as the target track) to be subjected to the data refreshment, to the track again, the data may be lost. The reason for this will be explained below.

First, it is assumed that the power supply is interrupted during the operation of writing data to the target track again. In this case, the operation of writing the data to the target track fails to be completed. Thus, the data in the target track is corrupted. At this time, the data in the target track temporarily stored in the RAM is lost. Thus, even when the power supply is restored, the uncompleted data write operation cannot be performed again. Consequently, the data in the target track is lost.

To prevent such a problem, a particular track on the disk may be used in place of the RAM, described above. That is, the particular track on the disk may be used as a track for temporary saving to which the data in the target track is temporarily saved. In this case, the data read from the target track is written (temporarily saved) to the particular track on the disk. Then, the read data is written to the target track (that is, the track in which the data was present) again. Even if the power supply is interrupted during the rewrite of the data to the target track, the data written (saved) to the particular track is prevented from being lost. Thus, using the data written to the particular track allows the uncompleted data write operation to be performed again.

However, such a write operation as described below is required to refresh the data in the target track using the particular track on the disk in place of the RAM. That is, a write operation is required which allows the data read from the target track to be written (temporarily saved) to the particular track before being written again to the target track. The write operation requires a longer time than a data write to the RAM. The efficiency of the data refreshment process is thus reduced. Two seek operations are also required, one of which moves the head from the target track to the particular track and another which moves the head from the particular track to the target track. The two seek operations further reduce the efficiency of the data refreshment process.

As described above, by using the particular track (track for temporary saving) on the disk in place of the RAM, the interruption of the power supply can be dealt with, but the efficiency of the data refreshment process may decrease.

BRIEF DESCRIPTION OF THE SEVERAL VIEWS OF THE DRAWINGS

A general architecture that implements various features of the invention will now be described with reference to the drawings. The drawings and their associated descriptions are provided to illustrate the embodiments of the invention and not to limit the scope of the invention.

FIG. 3 is an exemplary conceptual drawing of a data refreshment process used in the embodiment;

FIG. 4 is a diagram showing an example of a data structure of a write count table used in the embodiment;

FIG. 5 is a diagram showing an example of a data structure of a track shift table used in the embodiment;

FIG. 6 is an exemplary flowchart illustrating a general operation of HDD in FIG. 1;

DETAILED DESCRIPTION

Various embodiments according to the invention will be described hereinafter with reference to the accompanying drawings. In general, according to one embodiment of the invention, a magnetic disk drive is provided. This magnetic disk drive comprises: a disk configured to have a set of tracks thereon; and a controller configured to perform refresh control for reading data by a head from a track on the disk to be refreshed and for writing the read data by the head to a spare track adjacent to the track from which the data has been read, the controller being configured to switch the track from which the data has been read to a new spare track after the writing.

Figure 1:
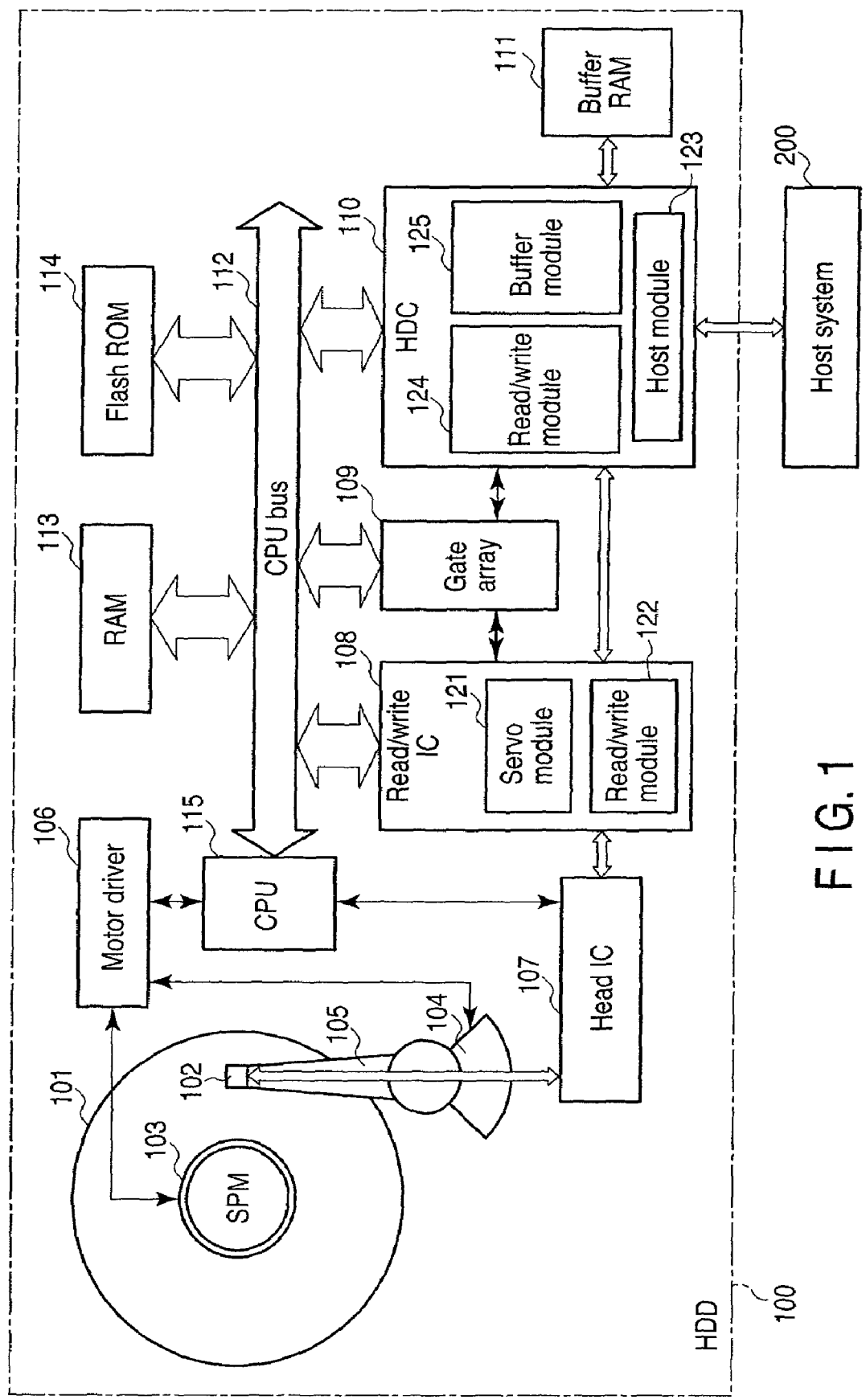
FIG. 1 is a block diagram showing an exemplary configuration of a magnetic disk drive (HDD) according to an embodiment of the invention.

FIG. 1 is a block diagram showing a configuration of a magnetic disk drive (HDD) according to an embodiment of the invention. The HDD 100 shown in FIG. 1 is a storage apparatus which writes data onto a recording surface of a disk (magnetic disk) 101 and reads data from the recording surface, in response to a request from a host system 200. The host system 200 is an electronic apparatus such as a personal computer which utilizes the HDD 100 as a storage apparatus.

The disk 101 is fixed to a spindle motor (SPM) 103 and is rotated at a constant speed by driving the SPM 103. For example, one disk surface of the disk 101 is a recording surface in which data may be magnetically recorded. A head (magnetic head) 102 is arranged over the recording surface of the disk 100. The head 102 is fixed to one end of an actuator 105. The other end of the actuator 105 is fixed to a voice coil motor (VCM) 104. The head 102 moves over a range of a circular trajectory around a pivot of the VCM 104 which range overlaps the surface of the disk 101.

The HDD 100, which includes a single disk 101, is assumed in the configuration in FIG. 1. However, in another configuration, a plurality of disks 101 may be fixed to the SPM 103 so that a gap of a certain size is formed between the disks 100. In this case, the plurality of actuators 105 are fixed to the VCM 104 so as to overlap one another so that the arrangement of the actuators 105 is adapted for gaps between the plurality of disks 101. The head 102 is fixed to one end of each of the plurality of actuators 105. Thus, the driving of the SPM 103 simultaneously rotates all the disks 101. The driving of the VCM 104 simultaneously moves all the heads 102. In the configuration in FIG. 1, one surface of the disk 101 is the recording surface. However, both surfaces of the disk 101 may be recording surfaces, with the heads 102 arranged over the respective recording surfaces.

Figure 2:
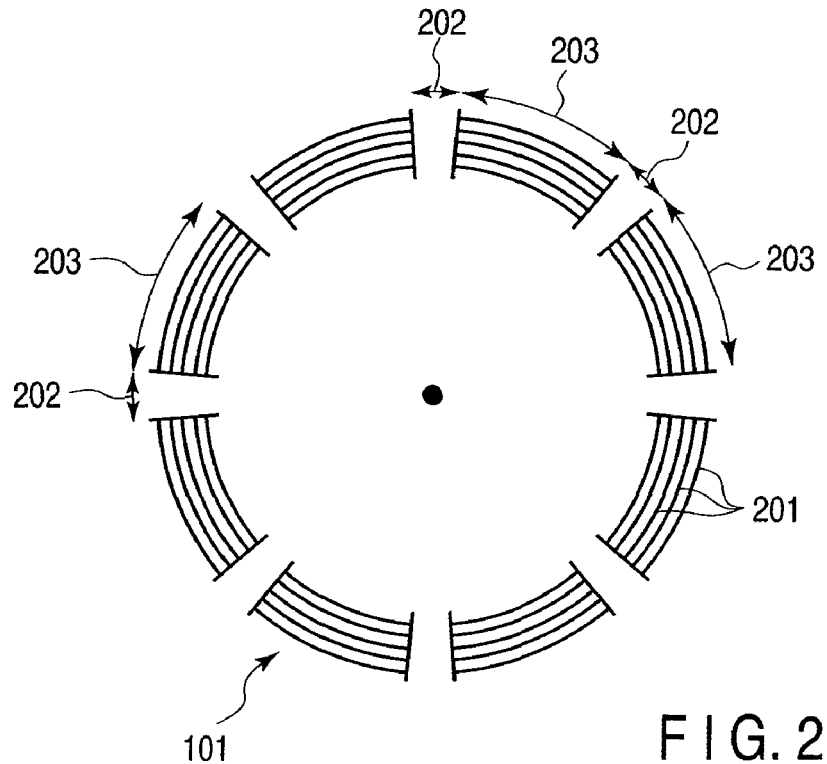
FIG. 2 is an exemplary conceptual drawing showing a format which is that of the disk shown in FIG. 1 and which includes arrangement of tracks.

FIG. 2 is a conceptual drawing showing a format of the disk 101 including a track arrangement. In FIG. 2, a plurality of tracks 201 are concentrically arranged on the recording surface of the disk 101. Data received from the host system 200 by the HDD 100 is recorded in at least one of the plurality of tracks 201 in accordance with an address designated by the host system.

Servo areas 202 and data areas 203 are alternately arranged on the plurality of tracks on the disk 101, at equal intervals. A servo signal used to position the head 102 is recorded in each of the servo areas 202. Data transferred by the host system 200 is recorded in each of the data areas 203.

Referring back to FIG. 1, a CPU 115 functions as a main controller for the HDD 100. The CPU 115 performs control for starting and stopping the SPM 103 and maintaining the rotation speed of the SPM 103, via a motor driver 106. The CPU 115 controls the driving of the VCM 104 via the motor driver 106 to move the head 102 to a target track and to settle the head 102 within a target range for the target track. The control for moving the head 102 to the target track is called seek control. The control for settling the head 102 within the target range for the target track is called head positioning control. The CPU 115 further performs control (a data refreshment process) for refreshing the data written to the track 201 in the disk 101.

The positioning of the head 102 is performed while the SPM 103 is rotating steadily after being started. As described above, the servo areas 202 (see FIG. 2) are arranged in a circumferential direction of the disk 101 at equal intervals. Thus, servo signals recorded in the servo areas 202 appear at temporally equal intervals in an analog signal read from the disk 101 by the head 102 and amplified by a head IC 107. A read/write IC 108 (a servo module 121 included in the reads/write IC 108) and a gate array 109 utilize this condition to process the analog signal to generate a signal for positioning of the head 102. Based on this signal, the CPU 115 controls the motor driver 106 to allow the motor driver 106 to supply a current (VCM current) for the positioning of the head 102 from the motor driver 106 to the VCM 104 in real time. The CPU 115 controls the SPM 103 and the VCM 104 via the motor driver 106 as described above, while controlling some other components of the HDD 100 and executing a command process. The CPU 115 is connected to a CPU bus 112.

The CPU bus 112 connects to the read/write IC 108, the gate array 109, a disk controller (HDC) 110, a RAM 113, and a flash ROM 114. The flash ROM 114 is a rewritable non-volatile memory. The flash ROM 114 is rewritten under the control of the CPU 115. A program to be executed by the CPU 115 is prestored in the flash ROM 114. The above-described control by the CPU 115 is performed by executing the program. A part of the storage area of the flash ROM 114 is used to store a track shift table 500 (see FIG. 5). The RAM 113 is used to store, for example, various variables used by the CPU 115. A part of the storage area of the RAM 113 is used as a work area for the CPU 115.

The read/write IC 108 includes a servo module 121 and a read/write module 122. The servo module 121 executes signal processing required for the positioning of the head 102. The signal processing includes the extraction of the servo signal. The read/write module 122 executes signal processing for a data read and a data write. The gate array 109 generates control signals, including a signal for the servo module 121 to extract the servo signal.

The HDC 110 is connected to not only the CPU bus 112 but also the read/write IC 108, the gate array 109 and a buffer RAM 111. The HDC 110 includes a host module 123, a read/write module 124, and a buffer module 125. The host module 123 includes a host interface function of receiving commands (a write command, a read command, and the like) transferred by the host system 200 and controlling data transfers between the host system 200 and the HDC 110. The read/write module 124 is connected to the read/write IC 108 and the gate array 109 to read and write data via the read/write IC 108. The buffer module 125 controls the buffer RAM 111. A part of the storage area of the buffer RAM 111 is used as a write buffer in which data (write data) to be written to the disk via the HDC 110 (the read/write module 124 in the HDC 110) is temporarily stored. Another part of the storage area of the buffer RAM 111 is used as a read buffer in which data (read data) read from the disk 101 via the HDC 110 is temporarily stored.

The read/write IC 108, the gate array 109 and the HDC 110 include respective control registers (not shown in the drawings). Each of these control registers is assigned to a part of a memory space for the CPU 115. The CPU 115 accesses the partial area to control the read/write IC 108, the gate array 109, or the HDC 110 via the corresponding control register.

With the HDD 100 in FIG. 1, a data read is performed as follows. First, a signal (analog signal) read from the disk 101 by the head 102 is amplified by the head IC 107. The amplified analog signal is separated into a servo signal and a data signal by the read/write IC 108. The data signal is decoded by the read/write module 122 in the read/write IC 108 and then transmitted to the HDC 110. The read/write module 124 in the HDC 110 processes the decoded data signal in accordance with a controlling signal from the gate array 109 to generate data to be transferred to the host system 200. The processing in this case includes detection and correction of a possible error in data based on ECC data described below. The generated data is stored in the buffer RAM 111 by the buffer module 125 in the HDC 110 and then transferred to the host system 200 by the host module 123 in the HDC 110.

With the HDD 100 in FIG. 1, a data write is performed as follows. Data transferred to the HDC 110 by the host system 200 is received by the host module 123 in the HDC 110. The buffer module 125 in the HDC 110 then stores the data in the buffer RAM 111. The data stored in the buffer RAM 111 is extracted by the buffer module 125. The data is then transmitted to the read/write IC 108 by the read/write module 124 in the HDC 110 in accordance with a controlling signal from the gate array 109. The data transmitted to the read/write IC 108 is encoded by the read/write module 122 in the read/write IC 108. The encoded data is transmitted to the head 102 via the head IC 107 and then written to the disk 101 by the head 102. The above-described data read and write are performed under the control of the CPU 115.

Now, the data refreshment process executed by HDD in FIG. 1 will be described in brief. As described above, when the data in the track to be subjected to data refreshment (target track) is temporarily saved in a particular track on the disk in order to deal with power supply interruption during the data refreshment, the efficiency of the data refreshment process may be reduced. Thus, the present embodiment uses a characteristic data refreshment process as described above which enables a possible decrease in processing efficiency to be prevented, while taking measures for dealing with the power supply interruption during the data refreshment.

In the present embodiment, a spare track Ti is provided on the disk 101. A track Tj located adjacent to the spare track Ti is a track Tj to be subjected to the data refreshment (a target track).

First, the head 102 reads data from the target track Tj. Then, the head 102 is moved from the target track Tj to the spare track Ti. The spare track Ti is located adjacent to the target track Tj. Thus, the head 102 can be moved from the target track Tj to the spare track Ti at a high speed.

Once the head 102 is moved to the spare track Ti, the data read from the target track Tj is written to the spare track Ti by the head 102. Thus, refreshment of the data in the target track Tj is completed. That is, the present embodiment is characterized in that the data in the target track Tj is written to the adjacent spare track Ti to refresh the data on the spare track Ti. The read of data from the target track Ti and the write of data to the spare track Ti described above are performed under the control of the CPU 115.

Even if the power supply is interrupted during the write operation of writing the data read from the target track Tj to the spare track Ti, the data in the target track Tj is prevented from being lost. Thus, when the power supply is recovered, the data can be read from the target track Tj and the read data can be written to the spare track Ti.

Thus, it should be noted that the present embodiment avoids writing the data read from the target track Tj to the target track (that is, the original track) Tj again via the particular track (track for temporary saving). The present embodiment eliminates the need for the operation of writing the data in the target track to the disk 101 (the particular track) for temporary saving. That is, compared to the refreshment of the data in the target track using the track for temporary saving, the present embodiment can reduce the number of operations of writing data to the disk 101 by one. This enables a possible reduction in the efficiency of the refreshment process to be prevented while dealing with the power supply interruption.

When the data read from the target track Tj is written to the spare track Ti, the target track Tj becomes a new spare track Tj. Then, a track Tk located adjacent to the new spare track Tj on a side of the spare track Tj which is opposite to the track Ti becomes a new target track Tk. Then, the track 102 is moved from the track Ti to the new target track Tk. The distance between the track Ti and the new target track Tk is equal to the width of two tracks. Thus, the head 102 can be moved from the track Ti to the new target track Tk at a high speed.

Then, the head 102 reads the data from the target track Tk. Then, the head 102 is moved from the target track Tk to the new (current) spare track Tj, located adjacent to the target track Tk. The data read from the target track Tk is then written to the current spare track Tj by the head 102. Similarly, the spare track is sequentially switched track by track. Every time the spare track is switched, the operation is performed which writes, to the current spare track, the data in the track located adjacent to the current spare track.

According to the present embodiment, the target track and the spare track are always arranged adjacent to each other. Thus, the head 102 can be moved from the target track to the spare track at a high speed. Furthermore, when the data in the target track is refreshed on the spare track, the target track becomes a new spare track. Then, the track located adjacent to the new spare track on the side of the spare track which is opposite to the track (old spare track) that has hitherto been used as a spare track becomes a new target track. The distance between the old spare track and the new target track is equal to the width of two tracks. Thus, the head 102 can be moved from the old spare track to the new target track at a high speed. Thus, compared to the refreshment of the data in the target track using the track for temporary saving, the present embodiment can reduce the time required to move the head. Also in this regard, the present embodiment enables a possible decrease in the efficiency of the refreshment process to be prevented while dealing with the power supply interruption.

Now, the above-described data refreshment process will be described with reference to a conceptual drawing in FIG. 3. In the present embodiment, the set of tracks 201 arranged on the recording surface of the disk 101 is divided into groups each with a given number of tracks. Thus, the data refreshment process is executed on each group. The group is called a track group. Here, for each track group, the total number of data write operations (write number) performed on the whole track group is counted. Once the count reaches a given value, the data refreshment process is executed on the track group.

In the example in FIG. 3, one track group on the disk 101 is shown. Here, for simplification of description, the track group is assumed to be composed of 11 tracks, tracks 0 to 11. The numerical values "0" to "10" in the notification of the tracks 0 to 10 each indicate the relative position of the track in the track group (the relative track position). A smaller value indicates that the track is positioned closer to the outer periphery of the disk 101. A larger value indicates that the track is positioned closer to an inner periphery of the disk 101.

In FIG. 3, a state 31 shows that one spare track is provided in one track group. Here, the spare track is the track 10. However, the spare track is dynamically switched as described below. It is assumed that data A to J are stored in the tracks 0 to 9 in the track group other than the spare track 10, respectively.

Now, it is assumed that the track group in the state 31 is to be subjected to the data refreshment. In this case, in the present embodiment, the track 9, located adjacent to the spare track 10 (on the outer peripheral side of the disk 101), is selected as a track to be subjected to the data refreshment (a target track). The data J is read from the track 9. Then, as shown by arrow 311 in FIG. 3, the read data J is written to the track 10, the current spare track. Thus, the data in the track 9 is refreshed on the track 10, located adjacent to the track 9.

Then, the track 9, which has hitherto been subjected to the data refreshment, becomes a new spare track in place of the track 10. That is, the spare track is switched from the track 10 to the track 9. In this state, the track 8, located adjacent to the new spare track 9 (on the outer peripheral side of the disk 101), is selected as a target track. The data I is read from the track 8. Then, as shown by arrow 312 in FIG. 3, the read data I is written to the track 9, the current spare track. Thus, the data I in the track 8 is refreshed on the track 9, located adjacent to the track 8.

A similar operation is sequentially performed, with the spare track switched. It is assumed that eventually, the data B in the track 1 is written to the track 2 as shown by arrow 319 in FIG. 3 and the data A in the track 0 is written to the track 1 as shown by arrow 320 in FIG. 3. It is further assumed that the spare track is switched from the track 1 to the track 0. Thus, once the track 0 becomes a spare track, that is, the track group in the state 31 in FIG. 3 is brought into a state 32 shown in FIG. 3, the data refresh process (data refreshment operation) on the track group is completed. This is called a forward refreshment process. That is, the forward refreshment process refers to the data refreshment process of writing the data in the target track to the track (spare track) located adjacent to the target track in a radially inward direction of the disk 101 (a direction in which the value of the relative track position increases). This direction is called a refreshment direction, and the operation of writing the data in the target track to the adjacent track is called a shift write.

It is assumed that the track group in the state 32 in FIG. 3 thereafter needs to be subjected to the data refreshment process. In this case, in contrast to the forward refreshment process, the track 1, located adjacent to the spare track 0, is selected as a target track. Then, the data A is read from the track 1. Then, as shown by arrow 321 in FIG. 3, the read data A is written to the track 0, the current spare track. Thus, the data A in the track 1 is refreshed on the track 0 located adjacent to the track 1.

Then, the track 1, which has hitherto been subjected to the data refreshment, becomes a new spare track in place of the track 0. That is, the spare track is switched from the track 0 to the track 1. In this state, the track 2, located adjacent to the new spare track 1 (on the inner peripheral side of the disk 101), is selected as a target track. The data B is read from the track 2. Then, as shown by arrow 322 in FIG. 3, the read data B is written to the track 1, the current spare track. Thus, the data B in the track 2 is refreshed on the track 1, located adjacent to the track 2.

A similar operation is sequentially performed, with the spare track switched. It is assumed that eventually, the data I in the track 9 is written to the track 8 as shown by arrow 329 in FIG. 3 and the data J in the track 10 is written to the track 9 as shown by arrow 330 in FIG. 3. It is further assumed that the spare track is switched from the track 9 to the track 10. Thus, once the track 10 becomes a spare track, that is, the track group in the state 32 in FIG. 3 is brought into a state 33 shown in FIG. 3, the data refresh process on the track group is completed. This is called a backward refreshment process. That is, the backward refreshment process refers to the data refreshment process of writing the data in the target track to the track (spare track) located adjacent to the target track in a radially outward direction of the disk 101 (a direction in which the value of the relative track position decreases).

Thereafter, every time any track group shown in FIG. 3 needs to be refreshed, the refreshment process is executed with the refreshment direction switched. That is, the forward refreshment process alternates with the backward refreshment process. In the example in FIG. 3, for simplification of description, it is assumed that the number of tracks including the spare track per track group is 11. In this example, the maximum possible storage capacity of the disk 101 is 10/11 of the total number of tracks (cylinders). Thus, in practice, the number of tracks per track group is preferably set to a large value.

FIG. 4 shows an example of the data structure of a write count table 400 that holds the number of writes for each track group (a data write number or a write execution number). The write count table 400 is stored, for example, in a predetermined area of the RAM 113 in FIG. 1. That is, the predetermined area of the RAM 113 is used as a write count storage module in which the write count table 400 is stored.

In the example of the write count table 400 shown in FIG. 4, for generalization of description, it is assumed that the HDD 100 includes m heads 102 and is composed of n cylinder groups. In this case, for each of all the track groups expressed by a head (head number) h and a cylinder group (cylinder group number) c, the write count table 400 holds the number of writes (data writes) $W(h, c)$ for the track group ($0 \leq h \leq m-1$, $0 \leq c \leq n-1$). The number of writes for a track group is the number of operations of writing data to the track group. $W(h, c)$ is used as a write counter that counts the number of writes for the track group specified by the head number h and the cylinder group number c. In the configuration of the HDD 100 shown in FIG. 1, m is 1.

The cylinder group is a set of a predetermined given number of cylinders, and the number of cylinders per cylinder group is the same as that of tracks per track group. Thus, the number of track groups present in the HDD 100 and having the same cylinder group number is equal to the number m of the heads 102. The track group is specified by the cylinder group number c and the head number h. When data is written to a track in the track group specified by the cylinder group number c and the head number h (a write access is performed), the write number (write counter) W(h, c) held in the count table 400 is incremented by the number of writes performed.

In the present embodiment, the write count table 400 is stored in the RAM 113 as described above. The contents of the RAM 113 are lost by interruption of the power supply. Consequently, the contents of the write count table 400 are also lost by the interruption of the power supply. Thus, in the present embodiment, the contents of a predetermined area in the RAM 113 including the write count table 400 are saved in a predetermined area of the disk 101 as required (for example, to change to a power saving state of the HDD 100). The contents including the count table 400 saved in the predetermined area of the disk 101 are read and restored in the RAM 113 when the HDD 100 is started (the power supply is turned on).

In the present embodiment, a track to which target data is written is switched every time the track group including the track is subjected to the data refreshment. For example, in FIG. 3, the track to which the data A is written is the track 0 in the state 31 or 33 or the track 1 in the state 32. To allow the target data to be accessed, information is required indicating in which direction and how far the above-described shift write has been performed. Based on this information, the CPU 115 corrects a deviation of the cylinder number in the result of normal address translation.

Now, the normal address translation will be described. Recent HDDs generally use what is called constant density recording (CDR). The HDD 100 in FIG. 1 is assumed to also use the CDR. The host system 200, which utilizes the HDD 100, generally provides the HDD 100 with a logical block address (LBA) as information indicating an access target block to the HDD 100. In this case, for example, in executing a command such as a read command or a write command which is given by the host system 200, the HDD 100 performs address translation (address calculation) so as to translate an LBA (Logical Block Address) provided by the host system 200 into a cylinder number, a head number, and a sector number (a physical address composed of the cylinder number, head number, and sector number) indicating a physical position on the disk 101. This is a normal address translation.

In the present embodiment, in order to allow correction of a deviation of the cylinder number in the result of the normal address translation, position information is held and managed. The position information indicates the position (relative position) of the spare track in the track group. To correct the deviation of the cylinder number, the direction of the shift write (refreshment direction) needs to be determined (detected). However, the refreshment direction can be determined from the position of the spare track in the track group, as described below. Thus, the present embodiment does not use any configuration that holds and manages information indicating the refreshment direction for each track group. However, for the track group on which the refreshment process is being executed (or is suspended), the refreshment direction of the refreshment process is managed based on refreshment management information described below.

FIG. 5 shows an example of the data structure of a track shift table 500 that holds the position of the spare track (position information indicating the position of the spare track) for each track group. In the example of the track shift table 500, shown in FIG. 5, for generalization of description, it is assumed that that the HDD 100 includes m heads 102 and is composed of n cylinder groups. In this case, for each of all the track groups expressed by the head (head number) h and the cylinder group (cylinder group number) c, the track shift table 500 holds the position S(h, c) of the spare track in the track group ($0 \leq h \leq m-1$, $0 \leq c \leq n-1$). The position S(h, c) of the spare track indicates the relative position (relative track position) of the spare track in the track group to which the spare track belongs. In the configuration of the HDD 100 shown in FIG. 1, m is 1.

The track shift table 500 is preferably saved in a rewritable nonvolatile memory so as to deal with the power supply interruption. The track shift table 500 contains a small amount of data. Thus, the present embodiment uses a configuration in which the track shift table 500 is saved in a predetermined area of the flash ROM 114 which is used to store programs. That is, the predetermined area of the flash ROM 114 is used as a position information storage module in which the track shift table 500 is stored.

As described above, the HDD 100 performs the normal address translation so as to translate LBA provided by the host system 200 into the cylinder number, the head number, and the sector number indicating the physical position on the disk 101. However, in the present embodiment, the cylinder number of the target track varies depending on the position of the spare track in the track group and the refreshment direction. Thus, in addition to the normal address translation, a process (correction process) is required which corrects the cylinder number in accordance with the position of the spare track indicated in the track shift table 500, as well as the refreshment direction.

Thus, the contents of the track shift table 500 are very important and essential for the correction process for determining the cylinder number of the target track. Thus, the track shift table 500 must be prevented from being lost without fail even if inadvertent power supply interruption occurs during operation of the HDD 100. Thus, the track shift table 500 is saved in the above-described predetermined area of the flash ROM 114.

On the other hand, in contrast to the track shift table 500, the write count table 400 is stored in the RAM 113. Thus, if inadvertent power supply interruption occurs during operation of the HDD 100, then after the HDD 100 is restarted, the last contents of the write count table 400 saved before the restarting are used. In this case, the lost data corresponds to only the number of writes performed after the last saving of the contents of the write count table 400 and before the power supply interruption.

In contrast, in the track shift table 500, given that the position S(h, c) of the spare track in a certain track group fails to be updated during a certain period, the cylinder numbers of the tracks in the certain track group cannot be corrected. Thus, the track shift table 500 needs to be always saved in a perfect form. Thus, given that the track shift table 500 is stored in the RAM 113 similarly to the write count table 400, the contents of the track shift table 500 need to be saved in a predetermined area of the disk 101 every time the data in one track is refreshed. This precludes the efficiency of the refreshment process from being improved.

Thus, the present embodiment uses a configuration in which the track shift table 500 is saved in the flash ROM 114 as described above. Here, to allow power supply interruption during updating of the track shift table 500 to be also dealt with, two track shift tables 500, an original track shift table 500 and a duplicate track shift table 500 may be provided. That is, the original and duplicate tables (track shift tables) 500 are saved in different pages in the flash ROM 114 so as to be individually updated. In this case, a configuration is used in which after updating of the original table 500 is completed normally, the duplicate table 500 is updated. Thus, regardless of a moment at which the power supply for the HDD 100 is interrupted, the contents of the track shift table 500 can be prevented from being lost.

A procedure of rewriting the flash ROM 114 generally involves, for example, erasing all the contents of each page and then writing new contents to the erased page. However, if the flash ROM 114 is recordable, data can be added to the page. If the flash ROM 114 is recordable, a difference area may be provided in the flash ROM 114 so that the flash ROM can be used as follows.

For example, instead of rewriting the entire track shift table 500, sequentially recording only differences, that is, changes in only S(h, c), in the difference area is performed until the difference area in the flash ROM 114 is used up. Then, once the difference area is occupied, the entire track shift table 500 is updated. The use of this configuration enables a reduction in the frequency at which an erasure operation is performed in the flash ROM 114. However, the scheme of recording the difference fails to allow the track shift table 500 to be directly referenced. Thus, the track shift table 500 indicating the latest state may be placed in a predetermined area of the RAM 113 so as to allow the track shift table 500 in the predetermined area to be referenced.

Now, the general operation of the HDD 100 in FIG. 1 which executes the refreshment process on each track group will be described with reference to a flowchart in FIG. 6. First, it is assumed that the HDD 100 is powered on to start operating the CPU 115 (block 601). Then, the CPU 115 executes a well-known initialization process and a well-known starting process on the HDD 100 as a whole (block 602). After the starting process, the CPU 115 can receive a command from the host system 200 via the HDC 110. The CPU 115 thus enters a command wait loop (blocks 603 to 607).

In block 603, upon determining reception of a command from the host system 200, the CPU 115 branches to block 611 to exit the command wait loop. The CPU 115 then executes a process corresponding to the command from the host system 200. In block 611, the CPU 115 determines whether or not the command from the host system 200 is a write command. If the command from the host system 200 is the write command, the CPU 115 executes a process for the write command (blocks 612 to 615).

If the received command is the write command (Yes in block 611), the cylinder number needs to be corrected as described above in order to allow a data write to the address requested by the host system 200. Thus, in block 612, a cylinder number correction process (real cylinder number calculation process) is executed to correct the cylinder number (to calculate the real cylinder number). Although not clearly shown in the flowchart in FIG. 6, it is assumed that before block 612 is reached, a general method has been used to execute the process of translating the address (for example, LBA) designated in the command (write command) from the host system 200 into a virtual cylinder number VCN, head number, and sector number (the normal address translation).

The virtual cylinder number VCN is a calculational, intermediate cylinder number used to determine an actual (normal) cylinder number. The actual cylinder number is called a real cylinder number RCN, in contrast to a virtual cylinder number VCN. A cylinder specified by the virtual cylinder number VCN is called a virtual cylinder. A cylinder specified by the real cylinder number RCN is called a real cylinder. The simple expression "cylinder" refers to a real cylinder.

The concept of use of a virtual cylinder number VCN is required in order to ensure one spare track for each track group (cylinder group). The virtual cylinder number VCN indicates the cylinder number of a track that the host system 200 can recognize except for the spare track (spare cylinder). The virtual cylinder number VCN is a cylinder number counted (calculated) within each track group (cylinder group) with the spare track in the track group skipped (that is, the presence of the spare track is not a prerequisite).

The virtual cylinder number VCN is introduced in order to hierarchize address translations (address calculations) as described below. First, a first address translation (address calculation) is performed as is the case in which an address translation is performed on the assumption that the data refreshment process in track group unit (the track refreshment process) used in the present embodiment is absent. In the first address translation, the LBA designated by the host system 200 is translated into a cylinder number, head number, and sector number, as is the case with the normal address translation. The host system does not recognize the spare track. Thus, a cylinder number acquired, through the first address translation, from the LBA designated by the host system 200 is a virtual cylinder number VCN. Then, the virtual cylinder number VCN is subjected to a second address translation (address calculation) and thus translated into a real cylinder number RCN.

As described above, in the present embodiment, before block 612 is reached, the LBA designated by the host system 200 has been translated into a virtual cylinder number VCN, head number, and sector number. Thus, in block 612, the CPU 115 performs a translation from the virtual cylinder number VCN into a real cylinder number RCN (calculation of the real cylinder number RCN). The translation is required for a write process. Details of block 612 will be described below. Upon carrying out block 612, the CPU 115 executes the write process (control for the data write operation) based on the real cylinder number RCN, head number, and sector number resulting from the translation (calculation) (block 613).

Once the write process (block 613) is completed, the CPU 115 updates the write count table 400 so as to reflect the write process on the write count table 400 (block 614). That is, when the write process has been executed on the track group specified by the head h and the cylinder group c, the CPU 115 updates the write number W(h, c) in the write count table 400 such that the write number W(h, c) reflects the write process. More specifically, the CPU 115 adds the number of writes to the write number W(h, c) in the write count table 400. Here, 1 is normally added to the write number W(h, c). However, if the write process has involved retries, the number of retries is also added to the write number W(h, c) because the retries affect adjacent tracks, as is the case with the normal write operation.

When block 614 is carried out, the process of the write command is completed. Thus, the CPU 115 executes a process of completing the command, including updating of the registers and cancellation of a busy state (block 615). The CPU 115 then returns to the command wait loop.

On the other hand, if the received command is not a write command (NO in block 611), the CPU 115 executes a process corresponding to the received command (block 620) and a process of completing the command (block 615). The CPU 115 then returns to the command wait loop. The process corresponding to the command that is not a write command is described in block 620 for convenience. However, in practice, various commands other than the write command are present. Thus, as many processes as commands are present; the processes include determination of command codes as performed in block 611 and processes corresponding to blocks 612 and 613. In particular, it should be noted that for commands such as the read command and a seek command for which the host system 200 specifies an access target, the process of translating the virtual cylinder number VCN into the real cylinder number RCN is executed before the command process, as is the case with block 612.

Next, it is assumed that the CPU 115 determines in block 603 within the command wait loop that no command has been received. In this case, an idling process is executed. The idling process is also executed after the command completing process has been executed in block 615. The idling process includes a track refreshment process. In the present embodiment, before the track refreshment process, the CPU 115 determines whether or not to execute the track refreshment process (blocks 604 and 605).

In block 604, the CPU 115 comprehensively determines whether to immediately execute the command from the host system 200 without executing the track refreshment process or to avoid the track refreshment process. The command needs to be immediately executed, for example, if the command is received from the host system 200 immediately after block 615 has been carried out. The refreshment process needs to be avoided when the HDD 100 is used under adverse conditions, for example, when external vibration exceeding a given level is applied to the HDD 100 or the environmental temperature of the HDD 100 deviates from a temperature range within which the operation of the HDD 100 is ensured. In block 605, based on the comprehensive determination in block 604, the CPU 115 determines whether or not the track refreshment process can be executed. Only upon determining that the track refreshment process can be executed can the CPU 115 execute the track refreshment process (block 606). Details of block 606 will be described below.

If the track refreshment process in block 606 is finished or the CPU 115 determines in block 605 that the track refreshment process is not to be executed, the CPU 115 then determines whether or not to execute a power saving process required to change to a power saving state. If the power saving process needs to be executed, the CPU 115 executes the process (block 607). The power saving process includes an unloading process of unloading the head 102 from the disk 101 and/or an SMP stopping process of stopping rotation of the SPM 103.

When the power saving process is executed in block 607, the CPU 115 returns to block 603. In contrast, if the command from the host system 200 needs to be immediately executed, the CPU 115 determines in block 607 that the power saving process is not to be executed. In this case, the CPU 115 returns to block 603 without executing the power saving process. The CPU 115 thereafter repeats the above-described process including block 603.

Figure 7:
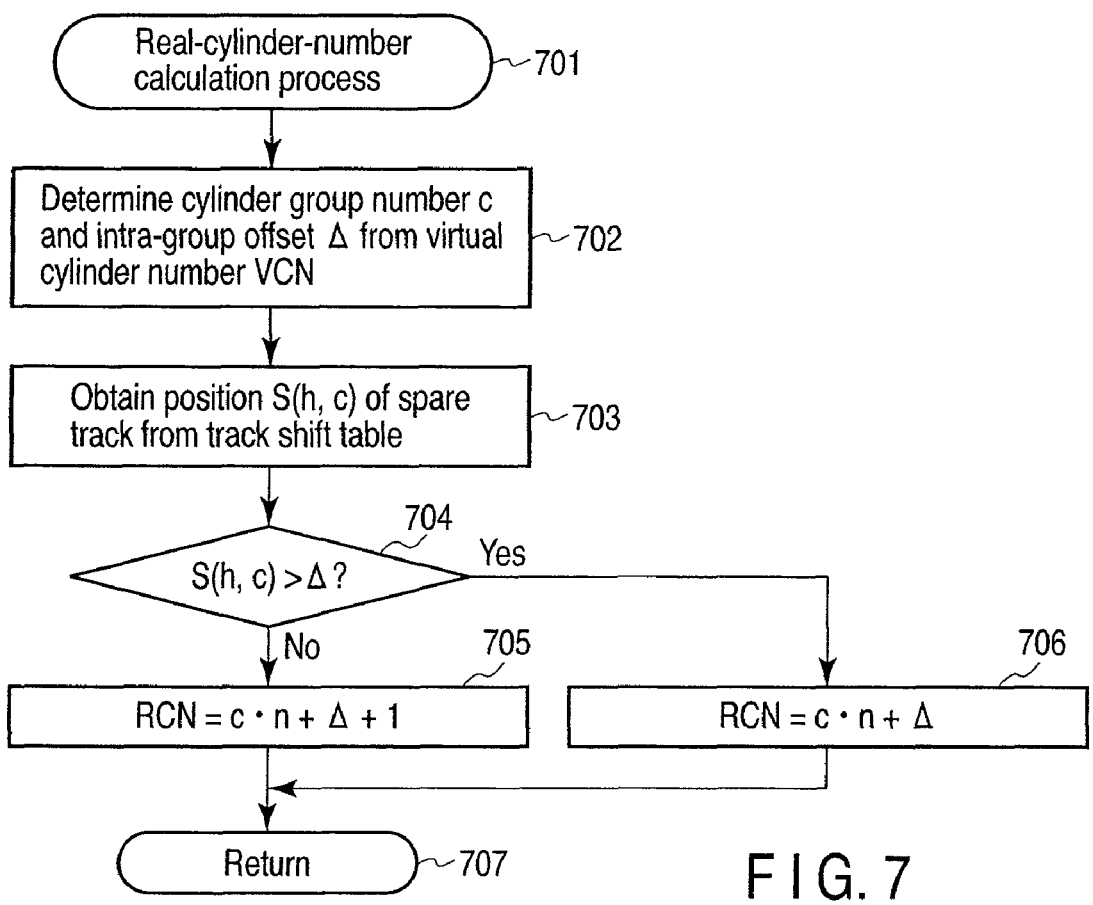
FIG. 7 is an exemplary flowchart showing a detailed procedure of a process of calculating a real cylinder number, the process being included in the flowchart in FIG. 6.

Next, a detailed procedure of the real cylinder number calculation process (cylinder number correction process), executed in block 612, will be described with reference to a flowchart in FIG. 7.

As described above, the virtual cylinder number VCN used in the present embodiment can be counted with the spare cylinder in each cylinder group skipped, that is, can be counted on the assumption that no spare cylinder is present. Thus, a virtual cylinder number VCN cannot be translated directly into a real cylinder number RCN. Thus, in the real cylinder number calculation process 701 shown in the flowchart in FIG. 7, the CPU 115 calculates the cylinder group number c of the cylinder group to which the cylinder (virtual cylinder) with the virtual cylinder number VCN belongs, and the offset (relative cylinder position) Δ of the virtual cylinder in the cylinder group (block 702).

In the present embodiment, the number of virtual cylinders per cylinder group has a given value, and is 10 in the example shown in FIG. 3. The cylinder group number c is the quotient (integral value) of the division of the virtual cylinder number VCN by the given value. The offset Δ of the virtual cylinder in the cylinder group corresponds to the remainder of the division. If, for example, the virtual cylinder number VCN is 34 (VCN=34), the cylinder group number c is 3, that is, the quotient of the division of 34 by 10. The offset (relative cylinder position or relative virtual cylinder number) Δ is 4, that is, the remainder of the division.

Then, the CPU 115 determines a relative real cylinder number in the cylinder group from the offset Δ of the virtual cylinder calculated in block 702, that is, the relative virtual cylinder number Δ in the cylinder group indicated by the cylinder group number c calculated in block 702, as described below. First, the CPU 115 references the track shift table 500 based on the head number h determined before block 612 is reached and the cylinder group number c calculated in block 702, to obtain the position (intra-cylinder-group relative cylinder position) S(h, c) of the spare cylinder (track) (block 703). In an example in which the cylinder group number c is 3 as described above, if the head number h is 1, the intra-cylinder-group relative cylinder position of the spare cylinder (track) is S(1, 3).

The relative real cylinder number can be determined based on a positional relationship between the intra-cylinder-group relative cylinder position S(h, c) (=S(1, 3)) of the spare cylinder (track) acquired from the track shift table 500 and the intra-cylinder-group offset (relative virtual cylinder number) Δ of the virtual cylinder. Specifically, the relative real cylinder number is determined depending on whether or not a value indicating the intra-cylinder-group relative cylinder position S(h, c) of the spare cylinder (track) is larger than the relative virtual cylinder number (offset) Δ (block 704).

If the value indicating the intra-cylinder-group relative cylinder position S(h, c) of the spare cylinder is larger than the relative virtual cylinder number (offset) Δ (YES in block 704), the relative real cylinder number (the intra-cylinder-group relative cylinder position of the real cylinder) is prevented from being affected by the spare cylinder. This prevents a possible difference between the relative virtual cylinder number and the relative real cylinder number. That is, if the spare cylinder follows the real cylinder (the space cylinder is present on a larger cylinder number side with respect to the real cylinder), no difference occurs between the relative virtual cylinder number and the relative real cylinder number. In this case, the value of the relative real cylinder number is equal to that of the relative real cylinder number.

In contrast, if the value indicating the intra-cylinder-group relative cylinder position S(h, c) of the spare cylinder is equal to or smaller than the relative virtual cylinder number (offset) Δ (NO in block 704), the relative real cylinder number is affected by the spare cylinder. That is, if a spare cylinder does not follow a real cylinder, the relative real cylinder number is affected by the spare cylinder, resulting in a difference corresponding to the spare cylinder. In this case, the relative real cylinder number is larger than the relative virtual cylinder number Δ by one.

Thus, the CPU 115 adds the real cylinder number of a leading cylinder in the cylinder group, that is, the product of the cylinder group number c and the number n of cylinders per cylinder group (in the above-described example, the product of 3 and 11, that is, 33), to the above-described relative real cylinder number to acquire the real cylinder number RCN (block 705 or 706).

Here, block 705 is carried out if the determination in block 704 is No. In block 705, the relative virtual cylinder number (offset) Δ acquired in block 702 plus 1 is used as a relative real cylinder number. In the above-described example, if S(1, 3) is equal to or smaller than a relative virtual cylinder number (offset) of 4, block 705 is carried out to add 4 and 1 to 33 to acquire a real cylinder number RCN of 38.

In contrast, block 706 is carried out if the determination in block 704 is YES. In block 706, the relative virtual cylinder number (offset) Δ acquired in block 702 is used directly as a relative real cylinder number. In the above-described example, if S(1, 3) is larger than a relative virtual cylinder number (offset) of 4 (Δ=4), block 706 is carried out to add 4 to 33 to acquire a real cylinder number RCN of 37.

Now, a detailed procedure of the track refreshment process in block 606, described above, will be described with reference to a flowchart in FIG. 8. In a track refreshment process 801 shown in the flowchart in FIG. 8, the CPU 115 references a currently-running flag described below to determine whether or not the refreshment process on any track group has been suspended (block 802). Block 802 relates to the capability of suspending the refreshment process for each track in the track group to be subjected to the data refreshment.

The reason why the refreshment process can be suspended for each track is that since a long time is required to refresh all the tracks in the track group (excluding the spare track), responsiveness to a command received from the host system 200 during the refreshment process needs to be prevented from decreasing. That is, in the present embodiment, if any command is received from the host system 200 during execution of the refreshment process, the refreshment process is suspended with priority given to the execution of the command.

If any of the track groups has undergone the suspension of the refreshment process (YES in block 802), this means that the track group to be refreshed has already been determined. In this case, the CPU 115 executes the processing in block 805 and subsequent blocks (the refreshment process).

On the other hand, if none of the track groups have undergone the suspension of the refreshment process (NO in block 802), the CPU 115 searches for a track group to be subjected to the refreshment process based on the write count table 400 (block 803). Here, the CPU 115 retrieves the number of writes W(h, c) with the greatest value in the write count table 400. The CPU 115 then determines whether or not any track group requires the refreshment process based on whether or not the retrieved number of writes W(h, c) exceeds a predetermined given value (block 804).

If the retrieved number of writes W(h, c) exceeds the given value, the CPU 115 determines that any track group requires the refreshment process and that the track group (represented by the head number h and the cylinder group number c) is associated with the number of writes W(h, c) (YES in block 804). Thus, if any of the track groups is determined to require the refreshment process (that is, any of the track groups is to be subjected to the refreshment process), the track group (that is, the track group associated with the number of writes W(h, c) with the greatest value) is also specified. In this case, the CPU 115 executes the refreshment process in block 805 and subsequent blocks.

In contrast, if the retrieved number of writes W(h, c) is equal to or smaller than the given value, the CPU 115 determines that none of the track groups require the refreshment process (NO in block 804). In this case, the refreshment process need not be executed, and the CPU 115 returns from the track refreshment process 801 to the original process (block 817). Thus, block 607 in the flowchart in FIG. 6 is executed.

Whether or not to execute the track refreshment process is determined in blocks 604 and 605 as well, described above. However, as is apparent from the above description, blocks 604 and 605 avoid the determination based on the write count table 400, that is, the determination of whether or not any of the track groups requires the track refreshment process.

However, if the write count table 400 needs to be referenced in blocks 604 and 605, a determination similar to that in blocks 803 and 804 may be performed in this stage. For example, such a determination may be performed when the determination of whether or not to execute the refreshment process in blocks 604 and 605 is based on the number of writes W(h, c) for each track group in addition to the above-described environmental conditions such as vibration and temperature. Details of such a determination are as follows. First, while the number of writes to the track group is small, the data is generally unlikely to be degraded. Thus, if the HDD 100 is used under adverse conditions, a possible risk is determined to be lower when the refreshment process is avoided than when the refreshment process is executed. In contrast, an increase in the number of writes promotes degradation of the data. Thus, in spite of somewhat adverse conditions, the possible risk is determined to be lower when the refreshment process is executed. Performing such a determination in blocks 604 and 605 allows a track group with the largest number of writes to be determined in blocks 604 and 605, with the number of writes acquired. In this case, this operation need not be performed in blocks 803 and 804.

Before block 805 is carried out, the track group (hereinafter referred to as the target track group) to be subjected to the track refreshment process has already been determined. Thus, in block 805, the CPU 115 references the track shift table 500 to acquire the relative position S(h, c) of the spare track in the target track group.

When the process proceeds from block 802 through blocks 803 and 804 to block 805, the CPU 115 determines in block 805 whether the refreshment process on the target track group is to be executed forward or backward, based on the acquired relative position S(h, c) of the spare track. The manner of the determination will be described below. In block 805, the CPU 115 further stores refreshment management information required to manage the refreshment in track group unit, in a predetermined area of the RAM 113.

The refreshment management information includes the track group number, a direction flag, and the currently-running flag. The track group number indicates the track group to be subjected to the refreshment process (that is, the target track) as determined in block 804. The direction flag indicates whether the refreshment process on the track group indicated by the track group number is to be executed forward or backward. In this case, the direction flag indicates the refreshment direction determined in block 805. The currently-running flag indicates whether or not the refreshment process on the track group indicated by the track group number is being executed (or has been suspended). In this case, the currently-running flag is set and indicates that the process is being executed.

In contrast, if the process branches from block 802 to block 805, effective refreshment management information is already stored in the predetermined area of the RAM 113 as described below. The currently-running flag contained in the refreshment management information is set and indicates that the refreshment process being executed. The direction flag contained in the refreshment management information indicates the direction of the refreshment process being executed. The currently-running flag may indicate whether or not the refreshment process on the track group indicated by the track group number has been suspended. In this case, the direction flag contained in the refreshment management information indicates the direction of the suspended refreshment process.

The contents of the processing in block 805 and subsequent blocks depend on whether the refreshment process on the track group indicated by the track group number is to be executed forward or backward. Thus, by referencing the direction flag contained in the refreshment management information stored in the RAM 113, the CPU 115 determines whether or not the forward refreshment process is to be performed on the track group (target track group) indicated by the track group number contained in the management information (block 806).

In the present embodiment, if any of the track groups has undergone the suspension of the refreshment, priority is given to the refreshment process on this track group. This prevents a plurality of track groups from being simultaneously subjected to the refreshment process. Thus, the refreshment management information corresponds to only one of the plurality of the track groups.

As described above, the refreshment management information is stored in the RAM 113. Thus, the refreshment management information is lost by interruption of the power supply to the HDD 100. Consequently, in the present embodiment, as is the case with the write count table 400, the refreshment management information is saved in the predetermined area of the disk 101, for example, when the HDD 100 is brought into to the power saving state. The refreshment management information saved in the predetermined area of the disk 101 is read in an initialization process executed when the HDD 100 is started (the HDD 100 is powered on). The refreshment management information is then restored in the RAM 113.

However, if the power supply is inadvertently interrupted, the latest refreshment management information is lost. Thus, during the initialization process following power on, the CPU 115 determines whether or not the latest refreshment management information has been lost, that is, whether or not the restored refreshment management information is correct, based on the track shift table 500 saved in the flash ROM 114. This determination is performed as follows.

First, the CPU 115 references the relative position (relative track position) S(h, c) of the spare track for each track group to search for (identify) a track group for which the relative position S(h, c) of the spare track does not correspond to the leading position (leading track position) or final position (final track position) of the track group. That is, the CPU 115 specifies a track group in which the spare track is not a leading track or a final track in the track group. The leading position of the track group indicates the relative position of a track in the track group which is closest to the outer periphery of the disk 101. That is, the leading track in the track group indicates a track in the track group which is closest to the outer periphery of the disk 101. On the other hand, the final position of the track group indicates the relative position of a track in the track group which is closest to the inner periphery of the disk 101. That is, the final track in the track group indicates a track in the track group which is closest to the inner periphery of the disk 101.

The specified track group is the track group subjected to the refreshment process at the time of the interruption of the power supply preceding the power-on. Thus, the CPU 115 determines whether the track group number of the specified track group is the same as that contained in the refreshment management information restored in the RAM 113. If the track group number of the specified track group is the same as that contained in the restored refreshment management information, the CPU 115 determines that the restored refreshment management information is correct and that the latest refreshment management information has been prevented from being lost.

In contrast, if the track group number of the specified track group is not the same as that contained in the restored refreshment management information, the CPU 115 determines that the restored refreshment management information is incorrect and that the latest refreshment management information has been lost. In this case, the CPU 115 determines whether the forward or backward refreshment is to be performed on the specified track group.

The refreshment may be determined to be performed either forward or backward. To determine the direction, the present embodiment uses the relative position S(h, c) of the spare track in the specified track group. More specifically, if the forward and backward refreshment operations are pre-requisites, the present embodiment uses a magnitude relationship between the numbers Nf and Nb of tracks to be refreshed, which relationship is determined from the relative position S(h, c) of the spare track. Here, if Nf is equal to or smaller than Nb, the forward refreshment is determined to be performed. If Nb is smaller than Nf, the backward refreshment is determined to be performed.

The determined refreshment direction may be different from the original direction. Thus, the present embodiment is configured such that even though all refreshment operations on the specified track group are completed, the number of writes (write counter) W(h, c) associated with the track group is prevented from being cleared in block 816. Thus, when the refreshment of the specified track group is completed, the refreshment process on the track group is continued with the refreshment direction switched.

For example, a 1-bit direction flag D(h, c) indicating the refreshment direction may be added to the relative position S(h, c) of the spare track for each track group, which position is held in the track shift table 500 saved in the flash ROM 114. That is, a configuration may be used in which the track shift table 500 holds the relative position S(h, c) of the spare track and the direction flag D(h, c) for each track group. Then, simple addition of 1 bit information per track group enables determination of the direction of the refreshment process executed at the time of the interruption of the power supply. This eliminates the need for power supply interruption measures associated with determination of the refreshment direction as described above.

In block 805, provided that effective refreshment management information is stored in the predetermined area of the RAM 113, the CPU 115 may determine the direction of the refreshment process based on the status of the direction flag contained in the refreshment management information. This applies to the case in which the process branches from block 802 to block 805.

However, provided that no effective refreshment management information is stored in the predetermined area of the RAM 113, that is, provided that the refreshment management information has been cleared, this means that the track refreshment is to be newly performed. Thus, the direction of the refreshment process needs to be determined. This applies to the case in which the process proceeds from block 802 through blocks 803 and 804 to block 805. In this case, the relative position S(h, c) of the spare track in the target track group, which position is acquired in block 805, is definitely the leading track position or final track position in the track group.

Thus, if the relative position S(h, c) of the spare track in the target track group is the final track position in the track group, the CPU 115 determines the refreshment process on the track group to be executed forward (block 805). In contrast, if the relative position S(h, c) of the spare track in the target track group is the leading track position in the track group, the CPU 115 determines the refreshment process on the track group to be executed backward (block 805). In block 805, the CPU 115 stores the refreshment management information containing the direction flag indicating the determined refreshment direction, in the predetermined area of the RAM 113. After carrying out block 805, the CPU 115 references the direction flag contained in the refreshment management information stored in the RAM 113 to determine whether or not the refreshment process is to be executed forward (block 806).

First, the case in which the direction of the refreshment process determined in block 806 is forward will be described. In this case, the CPU 115 sets the track located adjacent to the spare track on the outer peripheral side of the disk 101 to be the track (target track) to be refreshed. The CPU 115 then performs data read control via the HDC 110 so that the head 102 reads data from the adjacent track (block 810). The CPU 115 then performs data write control via the HDC 110 so that the read data is written to the spare track (block 811). Thus, the data in the track (target track) located adjacent to the spare track on the outer peripheral side is refreshed on the spare track.

Upon determining that the write of the data from the target track to the spare track (block 811) has been completed normally, the CPU 115 shifts the relative position S(h, c) of the spare track in the track group being refreshed, which position S(h, c) is held in the track shift table 500, toward the outer peripheral side by one track (block 812). This switches the spare track. The track shift table 500 is updated (the spare track is switched) to complete the refreshment of the one track.

Both immediately before and after the updating of the track shift table 500 (block 812), the data in the target track is present both in the target track (original track) and at the position to which the data read from the target track is written (the position corresponds to the track located adjacent to the original track on the inner peripheral side of the disk 10). However, if the write of the data in the target track to the spare track (block 811) is completed normally, the same data need not be present in both tracks.

Thus, in block 812, described above, the relative position S(h, c) of the spare track is shifted radially outward by one track as described above so as to switch the track treated as a target track immediately before the updating of the track shift table 500, to a new spare track. In this case, during the next refreshment process (blocks 810 and 811), data in a track located adjacent to the new spare track on the outer peripheral side of the disk 101 is written to the new spare track. When the track shift table 500 (which is saved in the flash ROM 114) is updated taking the power supply interruption during the updating taken into account, a possible failure in the switching of the spare track is prevented in spite of a power supply interruption during the updating.

Once the refreshment of the one track is completed, the CPU 115 determines whether or not suspension of the refreshment process has been requested (block 813). Reception of a command from the host system is a condition for determining whether or not the suspension of the refreshment process has been requested. When the host module 123 in the HDC 110 receives a command from the host system 200, the function of hardware in the host module 123 immediately brings the HDD 100 into the busy state. At the same time, a flag (busy flag) indicating the busy state is set. Thus, the CPU 115 checks the status of the busy flag in block 813.

The busy flag is set regardless of whether or not the refreshment operation is being executed. Thus, a command response time recognized by the host system 200 is the sum of (i) time from issuance of the command until the refreshment being executed is completed and (ii) primary command execution time. Thus, if a command is received from the host system 200, waiting until all the refreshment operations on the target track group are completed degrades the responsiveness to the command.

Thus, in the present embodiment, to avoid the possible degradation of the responsiveness to the command, the CPU 115 determines whether or not the suspension of the refreshment process has been requested as described above, every time the refreshment of one track is completed (block 813). If the suspension of the refreshment process has been requested, as in the case in which the command is received from the host system 200 during the refreshment of the one track (YES in block 813), the CPU 115 branches to block 817. That is, the CPU 115 immediately suspends the refreshment process to terminate block 606 (see FIG. 6). Upon terminating block 606, the CPU 115 carries out block 607. Also in block 607, the CPU 115 executes processing similar to that in block 813 so as to branch immediately to block 603 to start the process for the command from the host system 200.

On the other hand, if the suspension of the refreshment process has not been requested (NO in block 813), the CPU 115 determines whether all the refreshment operations on the target track group have been completed (block 814). In this case, the CPU 115 determines whether the relative position S(h, c) of the new spare track corresponds to the leading track position in the target track group. This is because if the refreshment is performed forward, completion of the refreshment of all the tracks in the group is indicated by a change of the relative position S(h, c) of the new spare track to the leading track position in the target track group.

If the relative position S(h, c) of the new spare track fails to correspond to the leading track position in the target track group, the refreshment of all the tracks in the group fails to have been completed (NO in block 814), the CPU 115 branches to block 810. Thus, the CPU 115 refreshes a new target track, that is, a track located adjacent to the new spare track on the outer peripheral side of the disk 101. In contrast, if the refreshment of all the tracks in the target track group has been completed (YES in block 814), the CPU 115 branches to block 815 to exit a process loop from block 810 to block 814 (a track group process loop).

Now, a case in which the refreshment direction determined in block 806 is backward will be described in brief. In this case, the CPU 115 executes processing in blocks 820 to 824. The processing in blocks 820 to 824 is a backward refreshment process corresponding to the forward refreshment process from block 810 to block 814. The backward refreshment process is similar to the forward refreshment process except that the direction is reversed. Here, it is assumed that with the backward refreshment process, the relative position S(h, c) of the new spare track corresponds to the final position in the target track group, so that the CPU 115 determines that the refreshment of all the tracks in the group has been completed (block 824). In this case, the CPU 115 branches to block 815 to exit a process loop from block 820 to block 824.

In block 815, to indicate that the refreshment process on the target track group has been completed and that no track group is being processed, the CPU 115 clears the refreshment management information stored in the RAM 113. Clearing the refreshment management information enables the determination in blocks 802 and 806 to be correctly performed.

Then, the CPU 115 initializes the number of writes W(h, c) held in the write count table 400 in association with the track group on which the refreshment process has been completed, to zero (that is, the CPU 115 clears the number of writes W(h, c)) (block 816). The number of writes W(h, c) for each track group held in the write count table 400 indicates the number of write operations performed on the track group. The number of writes W(h, c) is correlated with the level of degradation of the data in the track group associated with the number of writes W(h, c). Thus, in the present embodiment, the number of writes W(h, c) is treated as the level of data degradation for convenience. Immediately after the refreshment process on the track group is completed, the data in the group is not degraded. To reflect this in the number of writes W(h, c) associated with the track group on which the refreshment process has been completed, the number of writes W(h, c) is initialized to zero.

After carrying out block 816, the CPU 115 branches to block 802 again to start processing on the next track group. In this case, from block 802, the CPU 115 always branches to block 803 to perform a process including an operation of retrieving a track group requiring the data refreshment as described above. Without the request for the suspension of the refreshment process, the refreshment process performed on the track group (the track refreshment process) is terminated when no track group requires the track refreshment process (NO in block 804).

[First Modification]

Now, a first modification of the above-described embodiment will be described. The first modification is characterized in that, like the write count table 400, the track shift table 500 is stored in the RAM 113. This configuration is suitable for a case in which the flash ROM 114, shown in FIG. 1, is unsuitable for frequent data rewrites or in which a non-rewritable ROM is used instead of the flash ROM 114.

Figure 8:
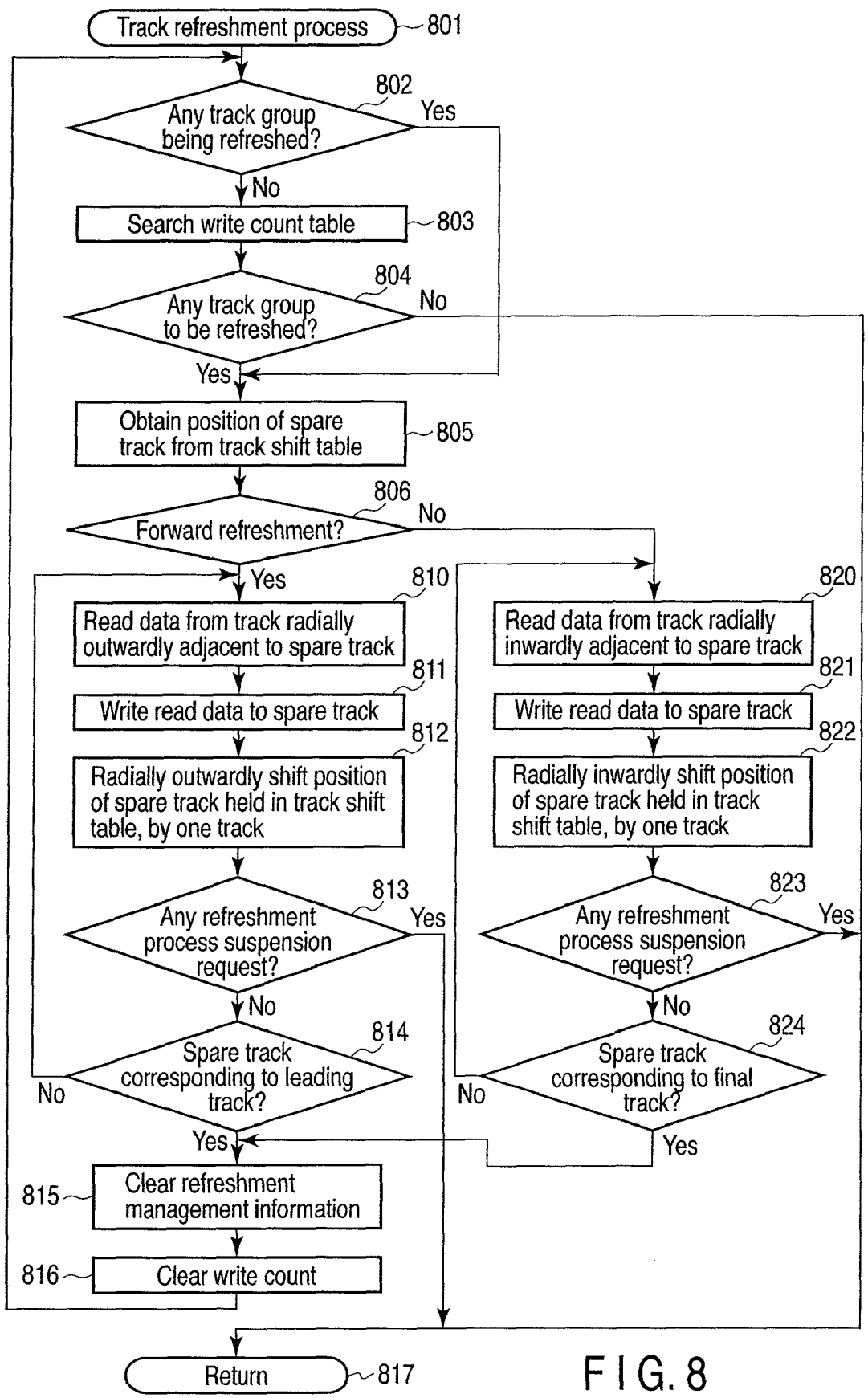
FIG. 8 is an exemplary flowchart showing a detailed procedure of a track refreshment process included in the flowchart in FIG. 6.

Also in the first modification, the track refresh process according to the flowchart in FIG. 8 is executed. However, in the first modification, for example, immediately after block 805 is carried out, the CPU 115 performs control such that the refreshment management information and track shift table 500 stored in the RAM 113 are saved in a predetermined area of the disk 101. In this case, the currently-running flag, contained in the refreshment management information, has been set, indicating that the refreshment process is being executed on the track group indicated by the track group number contained in the management information. Furthermore, in the first modification, for example, immediately after block 816 is carried out, the CPU 115 performs control such that the currently-running flag is reset, which is contained in the refreshment management information saved in the above-described area of the disk 101. The track shift table 500 currently stored in the RAM 113 is subsequently saved in the above-described area of the disk 101. According to the first modification, even if the power supply is inadvertently interrupted during the refreshment process, this can be detected by, during the following starting of the HDD 100, checking whether or not the currently-running flag indicating that the refreshment process is being executed remains in the predetermined area of the disk 101.

The HDC 110 generally adds error correction code (ECC) data to data written to sectors arranged in each of the tracks in the disk 101. In the first modification, a seed value for the ECC data is a value generated based on the virtual cylinder number of a track containing a sector to which ECC data is added. More specifically, the seed value for the ECC data is a value generated based on a virtual cylinder number and head number of the track containing the sector to which the ECC data is added, as well as the sector number of the sector. The value is, for example, a concatenation of a virtual cylinder number, head number, and sector number.

In a configuration in which a virtual cylinder number is used to generate a seed value for the ECC data, even if the relative position of a spare sector held in the track shift table 500 is incorrect, the incorrectness can be detected by the HDC 110. The reason for this is as follows. First, it is assumed that data is read from a track located adjacent to the incorrect spare sector in block 810 or 820. In this case, a difference in seed value results in an ECC error (seed error) in the HDC 110. This enables an incorrect relative position of the spare sector to be detected.

It is assumed that when the HDD 100 is started, the currently-running flag indicating that the refreshment process is being executed remains in the predetermined area of the RAM 113. In this case, the CPU 115 determines (detects) inadvertent occurrence of power supply interruption during the refreshment process. The refreshment management information including the currently-running flag and the track shift table 500 which are saved in the predetermined area of the disk 101 is read from the predetermined area of the disk 101 and stored (restored) in the predetermined area of the RAM 113.

Here, an inadvertent power supply interruption may have made incorrect the relative position of the spare track held in the track shift table 500 in association with the track group subjected to the refreshment process at the time of the inadvertent occurrence of the power supply interruption. Thus, in the first modification, if the relative position of the spare track is incorrect, the relative position is corrected as described below.

First, the relative position of the spare track held in the track shift table 500 in association with the track group subjected to the refreshment process at the time of the inadvertent occurrence of the power supply interruption is acquired from the track shift table 500 stored in the predetermined area of the RAM 113. The track group is indicated by the track group number included in the refresh management information stored in the predetermined area of the RAM 113.

Then, on the assumption that the virtual cylinder number is the same as the real cylinder number, a data read operation is performed on each of the tracks in the target track group. When the data read operation is performed, a boundary between a track having the same seed value and a track not having the same seed value (the track in which a seed error is occurring) is specified. One of the two tracks arranged adjacent to the boundary in which the seed error is occurring is determined to be the correct spare track. If the determined relative position of the spare track is different from the relative position of the spare track acquired from the track shift table 500, the acquired relative position of the spare track is incorrect. In this case, the CPU 115 corrects the value for the incorrect relative position of the spare track held in the track shift table 500, to the value for the determined relative position of the spare track.

Here, in order to speedy searches, a binary search is used to determine the order in which data is read from the tracks in the target track group. The sector in the track from which data is to be read is not particularly limited, and may be, for example, a sector at a predetermined relative position in the track. Alternatively, a sector with the least rotational delay in the track may be dynamically selected.

According to the first modification, even if the power supply is inadvertently interrupted, this can be detected the next time the HDD 100 is started. Furthermore, according to the first modification, information on the relative position of the spare track held in the track shift table 500 can be restored without the need to store the track shift table 500 in the flash ROM. Therefore, according to the first modification, even if the flash ROM 114 cannot be utilized to store the track shift table 500 or the HDD 100 does not include a flash ROM 114, a refreshment process based on the track shift table 500 can be implemented.

[Second Modification]

Now, a second modification of the above-described embodiment will be described. The second modification is characterized in that the unit of refreshment (that is, the unit of a data read and a data write for refreshment) is optimized in order to reduce the rotational delay (latency) in the backward refreshment process.

Figure 9A:
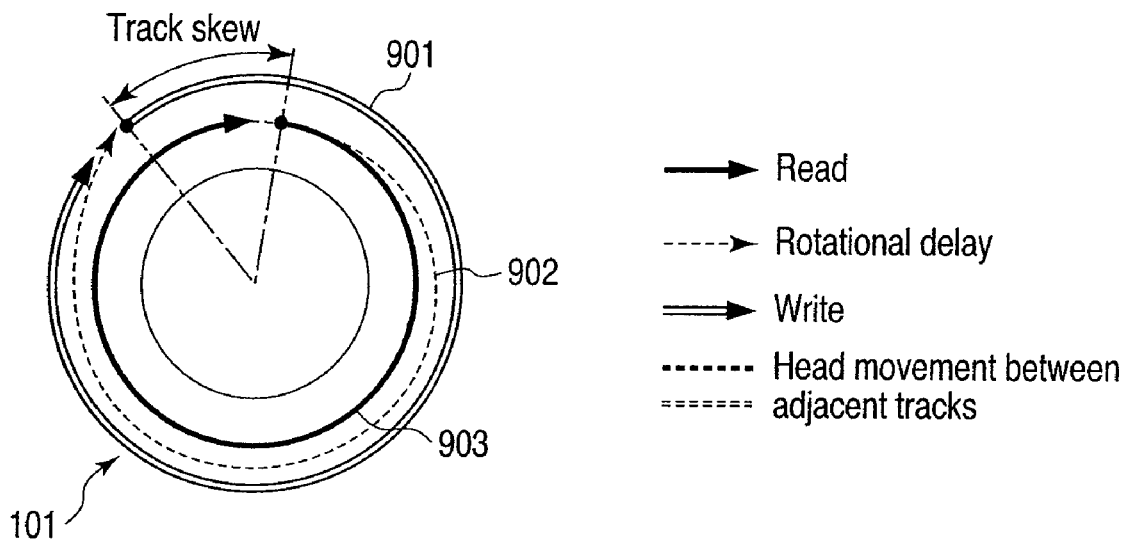
FIGS. 9A to 9C are exemplary conceptual drawings for optimization of the unit of data refreshment.
Figure 9B:
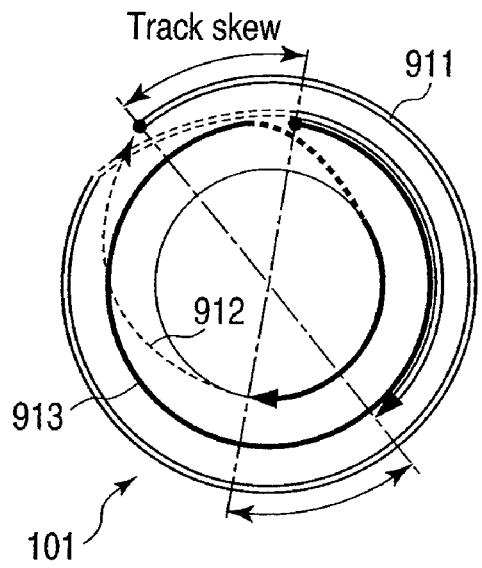
Figure 9C:
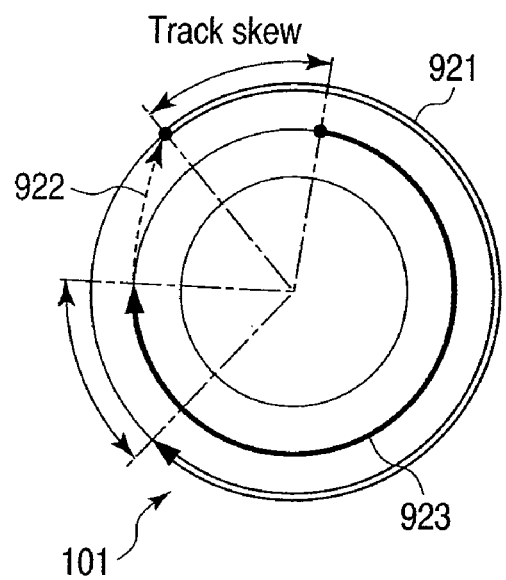

FIGS. 9A to 9C are conceptual drawings for the optimization of the unit of refreshment for the reduction in rotational delay in the backward refreshment process. As shown in FIGS. 9A to 9C a track skew is set between the adjacent tracks arranged on the disk 101 to adjust the position of the leading sector in each of the tracks. A value for the track skew is determined so as to minimize the rotational delay in a forward access, that is, a sequential access in a direction in which the LBA increases. That is, the time required to, after the final sector of a certain track on the disk 101 is accessed, move the head 102 to the next (adjacent) track is set to a minimum value for the track skew. Thus, the forward track refreshment allows the track skew to be optimized to reduce the rotational delay. However, the backward track refreshment significantly increases the rotational delay.

FIG. 9A shows trajectories described on the disk 101 by the head 102 during the backward track refreshment (that is, the refreshment process executed if the unit of refreshment is 1 track, as is the case with the above-described embodiment). As shown in FIG. 9A, in the backward track refreshment, the head 102 sequentially describes trajectories 903, 902, and 901 on the disk 101.

The trajectory 903 is described by the head 102 during the read operation (read access) of reading data from the target track. The trajectory 901 is described by the head 102 during the write operation (write access) of writing the read data to the spare track. In this case, a long rotational delay corresponding to the length of the trajectory 902 occurs.

In the second modification, the unit of refreshment (the amount of refreshment per refreshment process) is optimized to reduce such a rotational delay as involved in the trajectory 902, shown in FIG. 9A. By way of example, FIG. 9B shows trajectories described on the disk 101 by the head 102 during the backward refreshment process executed when the unit of refreshment is optimized to more than one and at most two tracks. In the example shown in FIG. 9B, the head 102 sequentially describes trajectories 913, 912, and 911 on the disk 101.

The trajectory 913 is described by the head 102 during the read access for reading data from the target track. The trajectory 911 is described by the head 102 during the write access for writing the read data to the spare track. The rotational delay corresponding to the length of the trajectory 912 is shorter than that corresponding to the length of the trajectory 902 in the example in FIG. 9A (refreshment of the one track unit).

Depending on the value of the track skew, the unit of refreshment is preferably less than one track, and corresponding optimization is possible. FIG. 9C shows trajectories described on the disk 101 by the head 102 during the backward refreshment process executed when the unit of refreshment is optimized to less than one track. In the example shown in FIG. 9C, the head 102 sequentially describes trajectories 923, 922, and 921 on the disk 101.

The trajectory 923 is described by the head 102 during the read access for reading data from the target track. The trajectory 921 is described by the head 102 during the write access for writing the read data to the spare track. The rotational delay corresponding to the length of the trajectory 922 is shorter than that corresponding to the length of the trajectory 902 in the example in FIG. 9A. Furthermore, increasing the unit of refreshment results in the need to ensure a large buffer area in the buffer RAM 111 corresponding to the increased unit of refreshment. Thus, the unit of refreshment may be decreased in size to reduce the buffer area.

Now, a specific method of calculating the unit of refreshment will be described. As described above, FIG. 9B shows the trajectories described on the disk 101 by the head 102 during the backward refreshment process executed when the unit of refreshment is optimized to more than one and at most two tracks. One track and two tracks correspond to one rotation and two rotations, respectively, of the disk 101. Thus, the expression "the unit of refreshment is more than one track and at most two tracks" can be replaced with the expression "the unit of refreshment corresponds to more than one and at most two rotations of the disk 101".

Here, the rotation number of the disk 101 per unit time (for example, one second) is defined as f [rotation/s]. The time required to move the head 102 over x tracks (the seek operation) is defined as $t_x$[s]. Furthermore, the amount of access corresponding to the trajectory 913 (the amount of access required to describe the trajectory 913), that is, the unit of refreshment, is represented by the rotation number u [rotations] of the disk 101. In this case, u is $1 < u \leq 2$ based on the prerequisites for the unit of refreshment.

Thus, the rotation number of the disk 101 corresponding to the trajectory 912 (rotation delay time) is defined as w [rotations]. $t_x$ includes not only the time required for the physical movement of the head 102 but also the setup time for a read or write access at a destination of the head 102. The track skew is equal to time $t_1$[s] required to seek one track (x=1). The rotation number of the disk 101 during the time $t_1$[s] is represented as $ft_1$. That is, the track skew corresponds to the rotation number $ft_1$.

In this case, FIG. 9B indicates that the read access and rotation delay time corresponding to each of the trajectories 913 and 912 requires a rotation number obtained by subtracting the rotation number $ft_1$ corresponding to the track skew from the rotation number of "2" of the disk 101. Thus, the following formula holds true.

$$u + w + ft_1 = 2 \qquad (1)$$

Furthermore, FIG. 9B indicates that w requires at least a rotation number required to move the head 102 over two tracks. However, depending on a start position of the trajectory 913, head movement between adjacent tracks may occur twice, that is, the trajectory 913 may cover three tracks, as in the case in which the start position of the trajectory 913 is located, for example, closer to a terminal of the leading track, in contrast to the example shown in FIG. 9B. Thus, w is restricted as indicated by:

$$w \geq ft_3 \qquad (2)$$

If the restriction indicated by Formula (2), described above, is not met, the extra rotation delay time corresponding to one rotation of the disk 101 occurs.

Based on Formulae (1) and (2), described above, and the prerequisite $1<u\leq2$ for the unit of refreshment u [rotations], the unit of refreshment u [rotations] can be determined as follows.

$$1<u\leq\{2-f(t_1+t_3)\}[\text{rotations}] \quad (3)$$

In this case, the highest efficiency is achieved when equality holds true (that is, when $u=2-f(t_1+t_3)$). Thus, the unit of refreshment may be determined so as not to exceed "$2-f(t_1+t_3)$".

In the example shown in FIG. 9B, after the write access corresponding to the trajectory 911 is completed, the next refreshment process is started, and the read access is then performed. The start position of the read access corresponds to the position where the read access corresponding to the trajectory 913 is completed. The amount of access in the write access corresponding to the trajectory 911 is equal to that in the read access corresponding to the trajectory 913. Thus, the rotation number of the disk 101 required for a seek operation for moving the head 102 from the position where the write access corresponding to the trajectory 911 is completed, to the start position of the next read access is equal to the rotation number $ft_1$, corresponding to the track skew. Consequently, the refreshment process can be shifted to the next refreshment process in the shortest rotation delay time.

FIG. 9C shows the trajectory described on the disk 101 by the head 102 during the backward refreshment process executed when the unit of refreshment is optimized to less than one track (less than one rotation). In this case, the unit of refreshment u [rotations] can be determined as follows, as in the case in which the unit of refreshment exceeds one track (one rotation).

$$0<u\leq\{1-f(t_1+t_2)\}[\text{rotations}] \quad (4)$$

For a more general expression of the optimization of the unit of refreshment, k is defined as an integral of at least one, and it is assumed that the unit of refreshment is optimized to more than (k−1) and at most k rotations. In this case, the unit of refreshment u [rotations] can be determined as follows.

$$k-1<u\leq\{k-f(t_1+t_{k+1})\}[\text{rotations}] \quad (5)$$

That is, the unit of refreshment u is determined based on a value $(t_1+t_{k+1})$ obtained by adding $t_{k+1}$ to $t_1$. Here, $t_1$ corresponds to the value of the track skew as described above. $t_{k+1}$ corresponds to the time required to move the head 102 from the position where the read access is completed to the start position of the write access for writing the data read by the read access.

For example, with the HDD 100 with f=5400 [rpm]=90 [rotations/s], $t_1$=2.0 [ms], $t_2$=2.2 [ms], and $t_3$=2.4 [ms], if k is 1, then the following formula holds true.

$$0<u\leq\{1-90\times(2.0+2.2)\times10^{-3}\}(=0.622)[\text{rotations}]$$

If k is 2, the following formula holds true.

$$0<u\leq\{2-90\times(2.0+2.4)\times10^{-3}\}(=1.604)[\text{rotations}]$$

In either case, the amount of access for one refreshment process may be set to be equal to the number of sectors (blocks) that can be accessed without exceeding the above-described rotation numbers. The calculation of the number of sectors needs to take into account the fact that a portion of an access range which corresponds to the head movement between the adjacent tracks includes no accessible sectors.

The various modules of the magnetic disk drive (HDD) described herein can be implemented as software applications, hardware and/or software modules. While the various modules are illustrated separately, they may share some or all of the same underlying logical or code.

While certain embodiments of the inventions have been described, these embodiments have been presented by way of example only, and are not intended to limit the scope of the inventions. Indeed, the novel apparatuses and methods described herein may be embodied in a variety of other forms; furthermore, various omissions, substitutions and changes in the form of the apparatuses and methods described herein may be made without departing from spirit of the inventions. The accompanying claims and their equivalents are intended to cover such forms or modifications as would fall within the scope and spirit of the inventions.

What is claimed is:

1. A magnetic disk drive performing a data refresh comprising:
    a disk with data tracks thereon; and
    a controller configured to perform a refresh of data written to the disk, using at least one of the data tracks as a spare data track, the refresh of data written to the disk comprising repeatedly moving data from a data track adjacent to the spare data track to the spare data track and switching the adjacent data track to become a next spare data track in accordance with moving data from the data track adjacent to the spare data track to the spare data track.

2. A method for controlling a refresh of data written to a disk with data tracks thereon, the method comprising:
    performing a refresh of data written to the disk, using at least one of the data tracks as a spare data track, the refresh of data written to the disk comprising repeatedly moving data from a data track adjacent to the spare data track to the spare data track; and
    switching the adjacent data track to become a next spare data track in accordance with moving data from the data track adjacent to the spare data track to the spare data track.

3. A controller configured to control a refresh of data written to a disk with data tracks thereon, the controller comprising;
    a control module configured to perform a refresh of data written to the disk, using at least one of the data tracks as a spare data track, the refresh of data written to the disk comprising repeatedly moving data from a data track adjacent to the spare data track to the spare data track and switching the adjacent data track to become a next spare data track in accordance with moving data from the data track adjacent to the spare data track to the spare data track.

* * * * *